United States Patent
Sagae et al.

(10) Patent No.: US 10,237,832 B2
(45) Date of Patent: Mar. 19, 2019

(54) MOBILE STATION AND METHOD FOR USE IN RADIO COMMUNICATION SYSTEM

(75) Inventors: Yuta Sagae, Tokyo (JP); Daisuke Nishikawa, Tokyo (JP); Hiroyuki Ishii, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 103 days.

(21) Appl. No.: 13/982,542

(22) PCT Filed: Mar. 15, 2012

(86) PCT No.: PCT/JP2012/056771
§ 371 (c)(1),
(2), (4) Date: Jul. 30, 2013

(87) PCT Pub. No.: WO2012/132945
PCT Pub. Date: Oct. 4, 2012

(65) Prior Publication Data
US 2013/0310105 A1   Nov. 21, 2013

(30) Foreign Application Priority Data
Mar. 31, 2011  (JP) .................. 2011-080202

(51) Int. Cl.
H04W 52/18     (2009.01)
H04W 52/36     (2009.01)
(Continued)

(52) U.S. Cl.
CPC .......... H04W 52/18 (2013.01); H04B 1/3838 (2013.01); H04W 52/34 (2013.01);
(Continued)

(58) Field of Classification Search
CPC .. G01R 29/0857; H03G 3/001; H03G 3/3042; H04B 1/3838; H04B 17/103;
(Continued)

(56) References Cited

U.S. PATENT DOCUMENTS

2002/0016155 A1* 2/2002 Charbonnier ...... G01R 29/0857
455/67.11
2004/0176125 A1* 9/2004 Lee ............................. 455/522
(Continued)

FOREIGN PATENT DOCUMENTS

EP           248379 A1    10/2002
WO    WO 2012067563 A1 *  5/2012  ............ H04W 36/00

OTHER PUBLICATIONS

R4-110016, 3GPP TSG-RAN4 Meeting #57_AH, Austin, USA, Jan. 17-21, 2009.*
(Continued)

*Primary Examiner* — Yuwen Pan
*Assistant Examiner* — Paul P Tran
(74) *Attorney, Agent, or Firm* — Osha Liang LLP

(57) ABSTRACT

One aspect of the present invention relates to a mobile station having a SAR backoff function including a SAR signaling receiving unit configured to receive a SAR signaling from a base station, the SAR signaling indicating that a SAR backoff is available, and a maximum transmit power determination unit configured to determine maximum transmit power of the mobile station depending on whether the SAR signaling receiving unit has received the SAR signaling, wherein in response to receiving the SAR signaling at the SAR signaling receiving unit, the maximum transmit power determination unit applies a power reduction factor associated with the SAR backoff to determine the maximum transmit power.

6 Claims, 6 Drawing Sheets

(51) Int. Cl.
*H04W 52/34* (2009.01)
*H04B 1/3827* (2015.01)
*H04W 36/00* (2009.01)
*H04W 36/24* (2009.01)

(52) U.S. Cl.
CPC ....... *H04W 52/365* (2013.01); *H04W 52/367* (2013.01); *H04W 36/0072* (2013.01); *H04W 36/24* (2013.01)

(58) Field of Classification Search
CPC .......... H04B 7/00; H04B 1/04; H04B 7/0874; H03H 7/40; H04W 4/02; H04W 28/18; H04W 28/22; H04W 36/00; H04W 36/24; H04W 52/08; H04W 52/10; H04W 52/16; H04W 52/221; H04W 52/225; H04W 52/267; H04W 52/28; H04W 52/283; H04W 52/288; H04W 52/30; H04W 52/34; H04W 52/36; H04W 52/367; H04W 52/52; H04W 52/54; H04W 60/04; H04W 64/00; H04W 72/02; H04W 72/12; H04W 88/06; H04W 36/0072; H04W 52/146; H04W 52/18; H04W 52/228; H04W 52/246; H04W 52/262; H04W 52/346; H04W 52/42; H04W 72/04; H01Q 1/36; H01Q 1/526; H01Q 1/245; H01Q 1/242; H01Q 1/243; H01Q 1/246; H01Q 9/04; H01Q 9/16; H01Q 15/141; H01Q 17/001; H01Q 19/005; H01Q 19/30; H04L 1/0003; H04L 1/0009
USPC .................. 340/572.1, 572.5, 573.1, 870.01; 343/700, 702, 718, 725, 729, 752, 761, 343/762, 832, 835, 837, 839, 844, 895, 343/84, 4; 370/206, 278, 314, 317, 318, 370/329, 332, 334, 338, 342, 465; 375/144, 145, 267, 340, 347, 348; 455/13.3, 17, 24, 25, 67.11, 69, 73, 77, 455/78, 83, 91, 93, 101, 102, 103, 1, 15, 455/117, 126, 127.1, 127.5, 158.1, 167.1, 455/168.1, 277.2, 410, 42, 2.1, 423, 424, 455/426.1, 426.2, 450, 451, 452.1, 456.1, 455/456.2, 500, 515, 550.1, 522, 552.1, 455/553.1, 561, 572, 574, 575.4, 575.7, 455/115, 422.1
See application file for complete search history.

(56) References Cited

U.S. PATENT DOCUMENTS

| | | | |
|---|---|---|---|
| 2006/0120330 A1* | 6/2006 | Lee ...................... | H04B 1/3838 370/331 |
| 2011/0222469 A1* | 9/2011 | Ali ........................ | H04L 1/0003 370/328 |
| 2011/0309941 A1* | 12/2011 | Hyde ...................... | A61N 1/16 340/600 |
| 2012/0021800 A1* | 1/2012 | Wilson ................ | H04W 52/146 455/550.1 |
| 2012/0147801 A1* | 6/2012 | Ho ...................... | H04W 52/365 370/311 |
| 2012/0176923 A1* | 7/2012 | Hsu .................... | H04W 52/243 370/252 |
| 2012/0178494 A1* | 7/2012 | Haim .................. | H04W 52/365 455/522 |
| 2012/0231784 A1* | 9/2012 | Kazmi .......................... | 455/423 |
| 2012/0236735 A1* | 9/2012 | Nory .................... | H04W 52/365 370/252 |
| 2012/0314640 A1* | 12/2012 | Kim ...................... | H04L 5/001 370/311 |

OTHER PUBLICATIONS

Pcmax for CA; R4-110561: TSG-RAN Working Group 4 (Radio) meeting AH#5, Austin, TX., USA, Jan. 17-21, 2011; Ericsson, Agenda Item: 4.2.3.*
International Search Report issued in PCT/JP2012/056771 dated Apr. 10, 2012 (3 pages).
Written Opinion issued in PCT/JP2012/056771 dated Apr. 10, 2012 (3 pages).
3GPP TS 36.101 V10.1.0; "3rd Generation Partnership Project; Technical Specification Group Radio Access Network; Evolved Universal Terrestrial Radio Access (E-UTRA); User Equipment (UE) radio transmission and reception (Release 10)"; Dec. 2010 (198 pages).
3GPP TS 36.213 V10.0.1; "3rd Generation Partnership Project; Technical Specification Group Radio Access Network; Evolved Universal Terrestrial Radio Access (E-UTRA); Physical layer procedures (Release 10)"; Dec. 2010 (98 pages).
Office Action issued in the counterpart Chinese Patent Application No. 201280015914.4, dated Mar. 18, 2016 (16 pages).
Mediatek; "Pcmax for Rel-10"; 3GPP TSG RAN WG4 Meeting 3GPPRAN4#58, R4-110890; Taipei, Taiwan; Feb. 21-25, 2011 (2 pages).

* cited by examiner

MOBILE STATION AND METHOD FOR USE IN RADIO COMMUNICATION SYSTEM

TECHNICAL FIELD

The present invention generally relates to a radio communication system and more particularly relates to techniques for determining transmit power of a SAR backoff enabled mobile station.

BACKGROUND ART

In a LTE (Long Term Evolution) scheme, an OFDMA (Orthogonal Frequency Division Multiple Access) scheme is used as a downlink radio access scheme, and a SC-FDMA (Single-Carrier Frequency Division Multiple Access) scheme is used as an uplink radio access scheme.

The OFDMA scheme is a multi-carrier transmission scheme where a frequency band is segmented into multiple narrower frequency bands (subcarriers) and data is transmitted in the individual subcarriers. According to the OFDMA scheme, faster transmission and improved frequency utilization efficiency can be achieved by densely arranging the subcarriers orthogonally to a frequency axis.

The SC-FDMA scheme is a single-carrier transmission scheme where a frequency band is segmented and different frequency bands are assigned to mobile stations for data transmission. According to the SC-FDMA scheme, since variations of transmit power can be suppressed, power consumption of the mobile stations can be reduced.

In the LTE scheme, the maximum transmit power available for a mobile station for uplink transmission is basically determined based on power capability of the mobile station, an assigned resource block, an applied modulation scheme, adjacent carrier interference and so on. Specifically, each mobile station determines the maximum transmit power $P_{cmax}$ available for uplink transmission within the range of $P_{cmax\_L} < P_{cmax} < P_{cmax\_H}$. Here, the lower bound $P_{cmax\_L}$ and the upper bound $P_{cmax\_H}$ are defined as follows, $$P_{cmax\_L} = \text{Min}\{P_{EMAX} - \Delta T_c, P_{PowerClass} - (\text{MPR} + \text{A-MPR}) - \Delta T_c\},$$

and $$P_{cmax\_H} = \text{Min}\{P_{EMAX}, P_{PowerClass}\}, \text{respectively},$$

where $P_{EMAX}$ represents the maximum transmit power of the mobile station indicated from the network side, $\Delta T_c$ represents an allowable reduction amount in use of resource blocks in band edges, and $P_{PowerClass}$ represents the maximum transmit power that should be provided to the mobile station. Also, MPR (Maximum Power Reduction) represents an allowable reduction amount determined based on the modulation scheme (such as QPSK) and the number of resource blocks, and A-MPR (Additional Maximum Power Reduction) represents an allowable reduction amount to avoid giving interference to adjacent systems.

The maximum transmit power $P_{cmax}$ of the mobile station is determined within the range between the calculated lower and upper bounds $P_{cmax\_L}$ and $P_{cmax\_H}$, and actual transmit power is determined such that it cannot exceed the maximum transmit power $P_{cmax}$.

Also, standardization for a LTE-Advanced scheme, which is a development of the LTE scheme, is currently being promoted in a standardization organization 3GPP (3$^{rd}$ Generation Partnership Project). In the LTE-Advanced scheme, a Carrier Aggregation (CA) technique will be introduced to achieve a higher throughput than the LTE scheme while keeping backward compatibility with the LTE scheme. In the CA, multiple LTE carriers called component carriers (CCs) are simultaneously used in communication. In the LTE-Advanced scheme using the CA, the maximum transmit power $P_{cmax, c}$ is determined for each CC, and actual transmit power is determined for the CC such that it cannot exceed the maximum transmit power $P_{cmax, c}$.

Meanwhile, it is known that electromagnetic waves transmitted from a mobile station may affect the human body. In general, a Specific Absorption Rate (SAR) is used as an indicator indicative of an amount of energy to which the human body has been subjected from an electromagnetic wave emitting device for a certain time period, and the SAR acceptable for the human body is specified.

For example, see 3GPP TS 36.101 and 3GPP TS 36.213.

SUMMARY OF INVENTION

Problem to be Solved by the Invention

If a mobile station conducts transmission at the above-stated maximum transmit power $P_{cmax}$ or $P_{cmax, c}$, however, there is a likelihood that the specified SAR may not be satisfied. Assuming the case where the SAR provision is unsatisfied, the mobile station is configured to have a SAR backoff function to reduce the maximum transmit power in order to allow reduction in the maximum transmit power of the mobile station.

Specifically, for the above-stated maximum transmit power $P_{cmax}$, a reduction factor is introduced to reduce the lower bound $P_{cmax\_L}$, and it is proposed to define the $P_{cmax\_L}$ as follows, $$P_{cmax\_L} = \text{Min}\{P_{EMAX} - \Delta T_c, P_{PowerClass} - \text{MAX}(\text{MPR} + \text{A-MPR}, \text{P-MPR}) - \Delta T_c\},$$

where P-MPR (Power-Maximum Power Reduction) represents a reduction amount for reducing the transmit power to satisfy the SAR provision acceptable for the human body.

In the LTE-Advanced scheme, the lower bound $P_{cmax, c\_L}$ of the maximum transmit power $P_{cmax, c}$ is similarly determined for each CC in consideration of the P-MPR.

However, utilization of a SAR backoff to reduce the maximum transmit power by introducing the P-MPR is not necessarily allowed in all countries or regions. For example, at the present time, the utilization of the SAR backoff using the P-MPR is allowed in the US while it is not allowed in Japan. In the LTE scheme and the LTE-Advanced scheme, it is proposed to assign a global band serving as a common frequency band available all over the world. Consequently, it is foreseen that a mobile station enabling the SAR backoff corresponding to the global band may apply the SAR backoff in a country or region where the SAR backoff is unavailable.

In conjunction with the above problem, one object of the present invention is to provide techniques for determining the maximum transmit power of a SAR backoff enabled mobile station.

Means for Solving the Problem

In order to overcome the above problem, one aspect of the present invention relates to a mobile station having a SAR backoff function including a SAR signaling receiving unit configured to receive a SAR signaling from a base station, the SAR signaling indicating that a SAR backoff is available, and a maximum transmit power determination unit configured to determine maximum transmit power of the mobile station depending on whether the SAR signaling receiving unit has received the SAR signaling, wherein in response to receiving the SAR signaling at the SAR signaling receiving unit, the maximum transmit power determination unit applies a power reduction factor associated with the SAR backoff to determine the maximum transmit power.

Another aspect of the present invention relates to a mobile station having a SAR backoff function including a country code receiving unit configured to receive broadcast information from a base station and extract a country code from the received broadcast information and a maximum transmit power determination unit configured to determine maximum transmit power of the mobile station with reference to SAR backoff availability information indicating whether a SAR backoff is available in countries or regions associated with country codes, wherein if the SAR backoff is available in a country or region associated with the extracted country code, the maximum transmit power determination unit applies a power reduction factor associated with the SAR backoff to determine the maximum transmit power.

Advantage of the Invention

According to the present invention, it is possible to provide techniques for determining the maximum transmit power of a SAR backoff enabled mobile station.

EMBODIMENTS FOR CARRYING OUT THE INVENTION

Embodiments of the present invention are described below with reference to the drawings.

Initially, a radio communication system according to one embodiment of the present invention is described with reference to FIG. 1. The radio communication system according this embodiment is a LTE-Advanced system where radio communication is conducted using a CA technique. In the CA, multiple carrier called component carriers (CCs) are simultaneously used in communication in order to enable broader band transmissions. However, the present invention is not limited to the LTE-Advanced system and may be applied to any appropriate radio communication system, such as a LTE system, where a SAR backoff is applied to determine the maximum transmit power of a mobile station.

Figure 1:
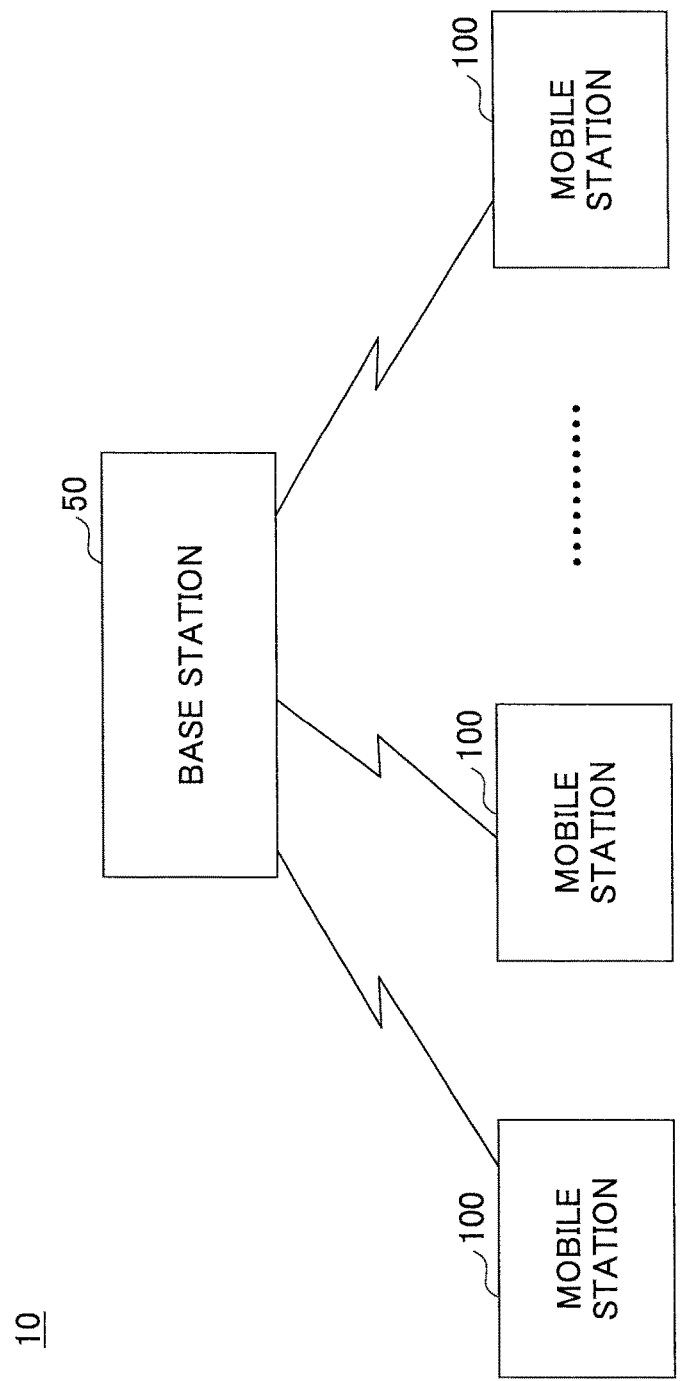
FIG. 1 is a block diagram for illustrating a radio communication system according to one embodiment of the present invention.

FIG. 1 is a block diagram for illustrating a radio communication system according to one embodiment of the present invention. As illustrated in FIG. 1, a radio communication system 10 includes a base station (BS) 50 and a mobile station (UE) 100. Although only one base station 50 is shown in the illustrated embodiment, multiple base stations 50 are typically disposed in the radio communication system 10 to cover a service area of the radio communication system 10. The base station 50 covers a certain geographical area and provides various communication services to the mobile station 100 through radio communication with the mobile station 100 camping in that area.

The mobile station 100 according to this embodiment is typically user equipment (UE) such as a mobile phone terminal, a smart phone and a personal computer. The mobile station 100 typically consists of one or more of various hardware resources such as an auxiliary storage device, a memory device, a CPU, a communication device, a display device and an input device. The auxiliary storage device consists of a hard disk, a flash memory or others and stores programs or data for implementing various operations as stated below. The memory device consists of a RAM (Random Access Memory) or others and upon an activation command of a program, reads and stores the program from the auxiliary storage device. The CPU serves as a processor for processing information and implements various functions as stated below in accordance with the programs stored in the memory device. The communication device consists of various communication circuits for wired and/or wireless connections with other apparatuses such as a server via a network. The display device and the input device provide user interfaces between the mobile station 100 and a user.

A mobile station according to the first embodiment of the present invention is described with reference to FIGS. 2-4. In this embodiment, the base station 50 sends the mobile station 100 a SAR signaling to allow the mobile station 100 to use the SAR backoff, and when receiving the SAR signaling, the mobile station 100 applies the SAR backoff to determine the maximum transmit power $P_{cmax,\,c}$ for each CC.

Figure 2:
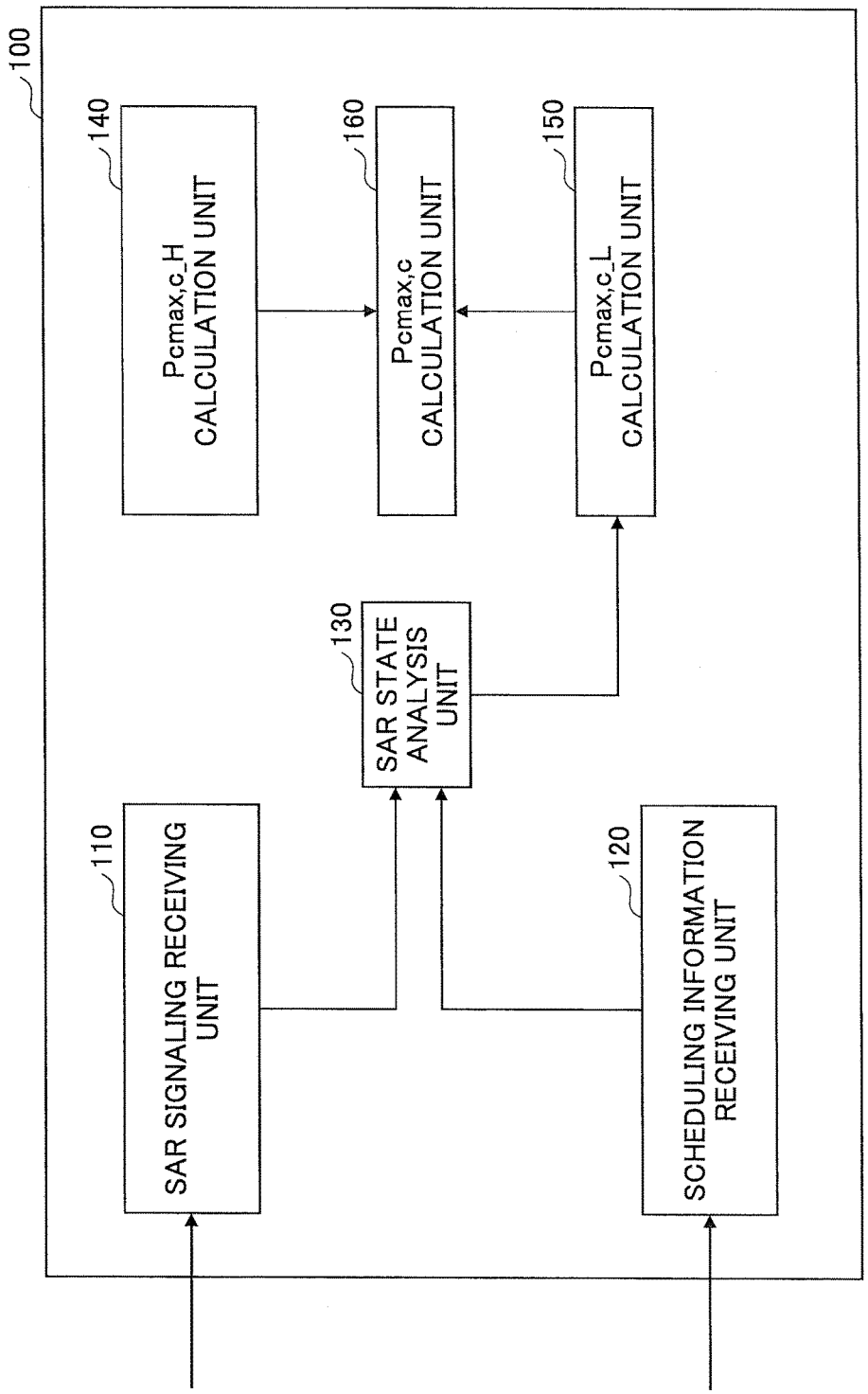
FIG. 2 is a block diagram for illustrating a mobile station according to a first embodiment of the present invention.

FIG. 2 is a block diagram for illustrating the mobile station according to the first embodiment of the present invention. As illustrated in FIG. 2, the mobile station 100 includes a SAR signaling receiving unit 110, a scheduling information receiving unit 120, a SAR state analysis unit 130, a $P_{cmax,\,c}$_H calculation unit 140, a $P_{cmax,\,c}$_L calculation unit 150 and a $P_{cmax,\,c}$ calculation unit 160.

The SAR signaling receiving unit 110 receives a SAR signaling from the base station 50 for allowing the mobile station 100 to use the SAR backoff. In one embodiment, the base station 50 broadcasts the SAR signaling as broadcast information. In this case, the SAR signaling receiving unit 110 detects the SAR signaling from the received broadcast information and provides the detected SAR signaling to the SAR state analysis unit 130. Also in other embodiments, after starting a connection operation with the mobile station 100, the base station 50 transmits the SAR signaling to the mobile station 100 in a RRC message or others in a dedicated manner. In this case, the SAR signaling receiving unit 110 detects the SAR signaling from the received RRC message and provides the detected SAR signaling to the SAR state analysis unit 130.

The scheduling information receiving unit 120 receives a control signal from the base station 50. This control signal typically consists of various control information pieces for uplink communication and includes scheduling information such as resource blocks assigned by the base station 50 to CCs. The scheduling information receiving unit 120 extracts the scheduling information from the received control signal and provides the extracted scheduling information to the SAR state analysis unit 130.

Upon receiving the SAR signaling from the SAR signaling receiving unit 110, the SAR state analysis unit 130 determines that the SAR backoff is available in the radio communication system 10 and informs the $P_{cmax,\ c\_}L$ calculation unit 150 that the SAR backoff is available. Also, the SAR state analysis unit 130 provides the scheduling information supplied from the scheduling information receiving unit 120 to the $P_{cmax,\ c\_}L$ calculation unit 150 in order to indicate which CC is assigned resource blocks.

For each CC, the $P_{cmax,\ c\_}H$ calculation unit 140 calculates an upper bound $P_{cmax,\ c\_}H$ of the maximum transmit power $P_{cmax,\ c}$ available for the mobile station 100. Specifically, for each CC, the $P_{cmax,\ c\_}H$ calculation unit 140 calculates $$P_{cmax,c\_}H = \text{Min}\{P_{EMAX}, P_{PowerClass}\}$$

and derives the upper bound $P_{cmax,\ c\_}H$ of the maximum transmit power $P_{cmax,\ c}$ of the mobile station 100. Here, $P_{EMAX}$ represents the maximum transmit power for each CC allowed for the mobile station 100, and $P_{PowerClass}$ represents an amount of power (for example, 23 dBm) where the mobile station 100 is capable of transmissions. The present invention is not limited to this, and the upper bound of the maximum transmit power available for the mobile station 100 only has to be set to any value that does not exceed the maximum transmit power allowed by the base station 50 and the maximum transmit power available for the mobile station 100. The $P_{cmax,\ c\_}H$ calculation unit 140 indicates the calculated $P_{cmax,\ c\_}H$ to the $P_{cmax,\ c}$ determination unit 160.

The $P_{cmax,\ c\_}L$ calculation unit 150 calculates a lower bound $P_{cmax,\ c\_}L$ of the maximum transmit power $P_{cmax,\ c}$ available for the mobile station 100 for each CC. Specifically, when receiving a notification from the SAR state analysis unit 130 to indicate that the SAR backoff is available in the radio communication system 10, the $P_{cmax,\ c\_}L$ calculation unit 150 calculates the lower bound $P_{cmax,\ c\_}L$ in consideration of P-MPR representing a reduction amount for reducing the transmit power to satisfy a SAR provision acceptable for the human body, that is, in accordance with $$P_{cmax,c\_}L = \text{Min}\{P_{EMAX} - \Delta T_c, P_{PowerClass} - \text{MAX}(\text{MPR} + \text{A-MPR}, \text{P-MPR}) - \Delta T_c\},$$

where $P_{EMAX}$ represents the maximum transmit power allowed by the base station 50 for the mobile station 100 for each CC indicated from the base station 50, $\Delta T_c$ represents an allowable reduction amount in use of resource blocks in band edges, $P_{PowerClass}$ represents the maximum transmit power where the mobile station 100 is capable of transmissions, MPR (Maximum Power Reduction) represents an allowable reduction amount determined based on the modulation scheme (such as QPSK) and the number of resource blocks, and A-MPR (Additional Maximum Power Reduction) represents an allowable reduction amount to avoid giving interference to adjacent systems.

On the other hand, if the $P_{cmax,\ c\_}L$ calculation unit 150 has failed to receive the notification from the SAR state analysis unit 130 to indicate that the SAR backoff is available in the radio communication system 10, the $P_{cmax,\ c\_}L$ calculation unit 150 sets P-MPR to zero (P-MPR=0) in the above $P_{cmax,\ c\_}L$ formula without consideration of P-MPR, that is, uses $$P_{cmax,c\_}L = \text{Min}\{P_{EMAX} - \Delta T_c, P_{PowerClass} - (\text{MPR} + \text{A-MPR}) - \Delta T_c\}$$

to calculate the lower bound $P_{cmax,\ c\_}L$.

The $P_{cmax,\ c\_}L$ calculation unit 150 calculates the lower bound $P_{cmax,\ c\_}L$ in accordance with the selected formula for each CC having a resource block assigned based on the scheduling information received from the SAR state analysis unit 130. The $P_{cmax,\ c\_}L$ calculation unit 150 indicates the calculated $P_{cmax,\ c\_}L$ to the $P_{cmax,\ c}$ determination unit 160.

The $P_{cmax,\ c}$ determination unit 160 determines the maximum transmit power $P_{cmax,\ c}$ for each of the CCs assigned by the base station 50 within a range defined by the upper bound $P_{cmax,\ c\_}H$ received from the $P_{cmax,\ c\_}H$ calculation unit 140 and the lower bound $P_{cmax,\ c\_}L$ received from the $P_{cmax,\ c\_}L$ calculation unit 150. A determination method for the $P_{cmax,\ c}$ is appropriately determined in each mobile station 100 in consideration of characteristics of a RF circuit installed in that mobile station 100.

Figure 3:
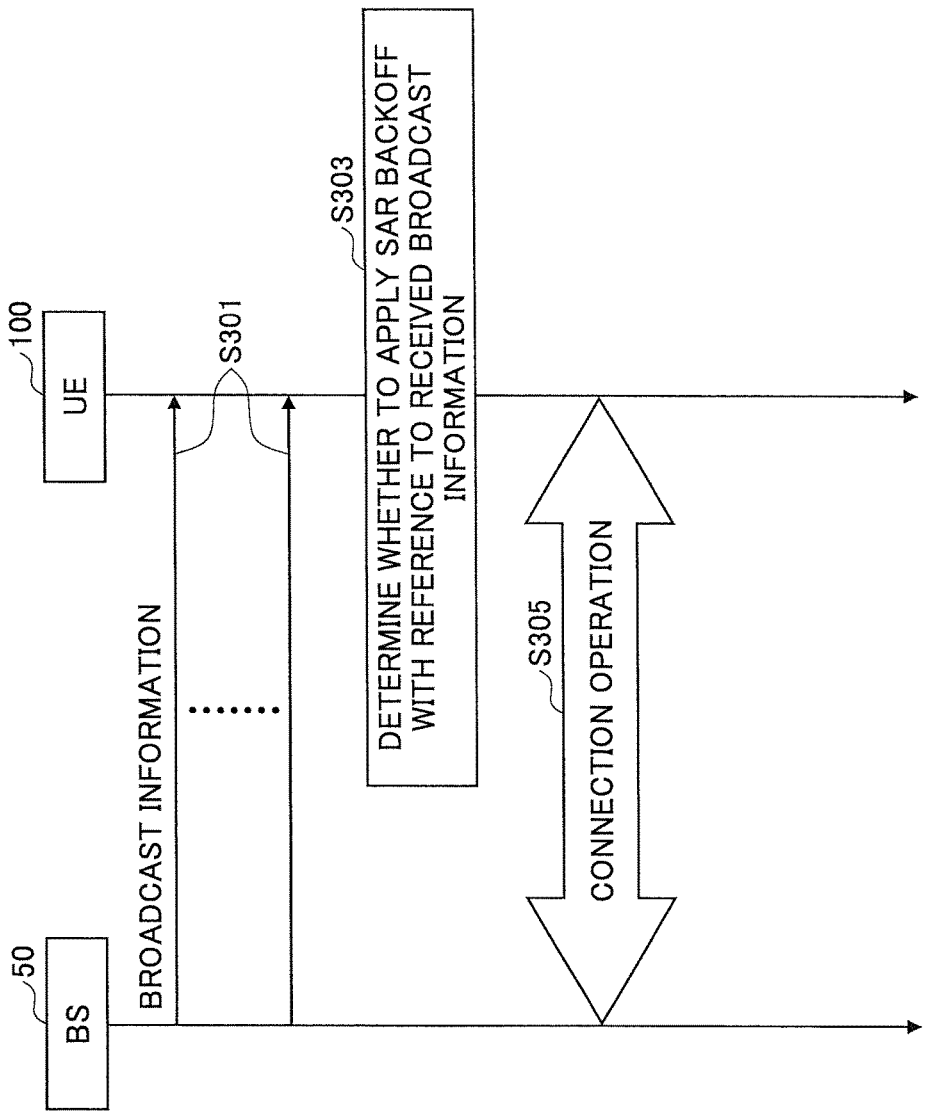
FIG. 3 is a sequence diagram for illustrating one exemplary operation in the radio communication system according to the first embodiment of the present invention.

FIG. 3 is a sequence diagram for illustrating one exemplary operation in the radio communication system according to the first embodiment of the present invention. In this embodiment, an operation in a mobile station is described for detecting a SAR signaling from broadcast information from a base station and determining that the SAR backoff is available.

At step S301, the base station (BS) 50 periodically broadcasts information including a SAR signaling indicating that the SAR backoff is available in the radio communication system 10.

At step S303, upon receiving the broadcast information from the base station 50, the mobile station (UE) 100 detects the SAR signaling from the received broadcast information and determines based on the detected SAR signaling that the SAR backoff is available in the radio communication system 10.

At step S305, the mobile station 100 performs a connection operation in accordance with the received broadcast information and establishes a radio connection with the base station 50. After establishing the radio connection, the mobile station 100 calculates $P_{cmax,\ c\_}L$ for each CC in accordance with the above-stated P-MPR introduced formula to satisfy the SAR provision and determines the maximum transmit power $P_{cmax,\ c}$.

Figure 4:
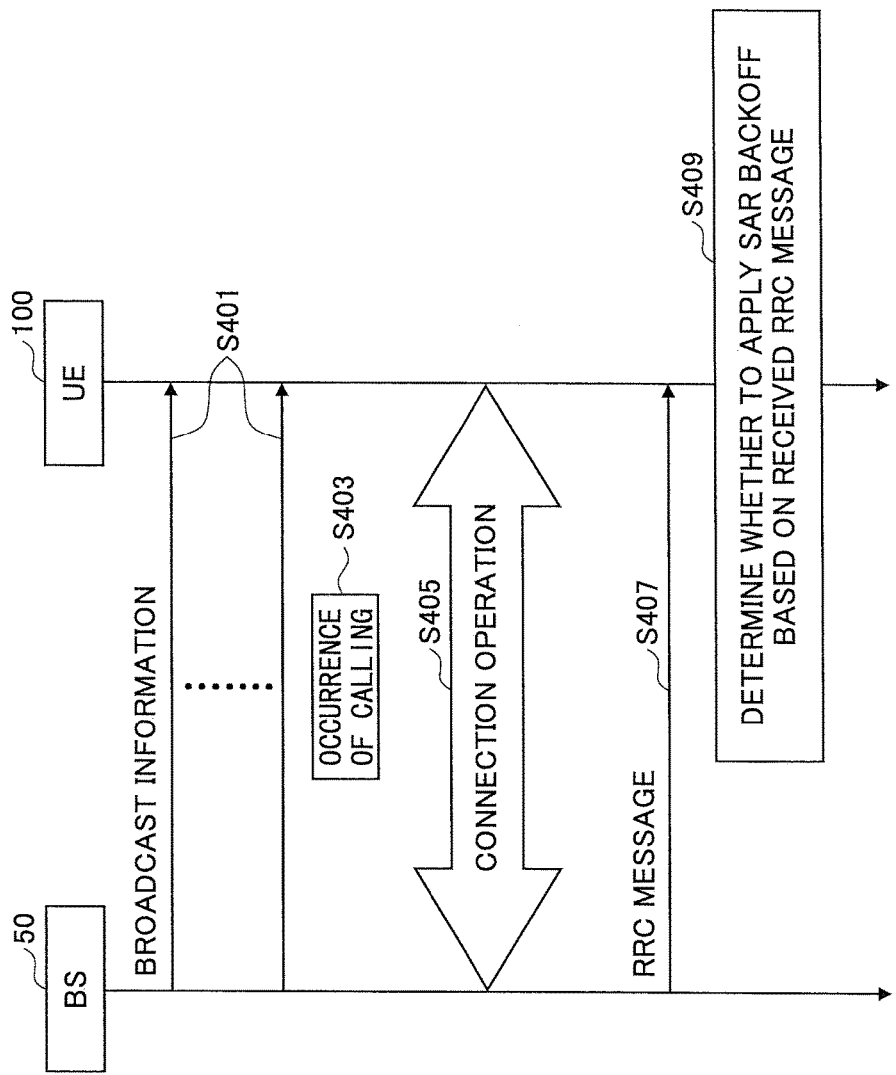
FIG. 4 is a sequence diagram for illustrating another exemplary operation in the radio communication system according to the first embodiment of the present invention.

FIG. 4 is a sequence diagram for illustrating another exemplary operation in the radio communication system according to the first embodiment of the present invention. In this embodiment, an operation in the mobile station 100 is described where after starting a connection operation for radio connection with the base station 50, the mobile station 100 receives a SAR signaling via a RRC message in a dedicated manner and detects that the SAR backoff is available.

At step S401, the base station (BS) 50 periodically broadcasts information.

At step S403, there arises any connection trigger event, such as occurrence of a call, in the base station 50 or the mobile station (UE) 100.

At step S405, a connection operation between the base station 50 and the mobile station 100 is conducted.

At step S407, the base station 50 sends the mobile station 100 a RRC message in a dedicated manner. The RRC message includes a SAR signaling indicating that the SAR backoff is available.

At step S409, upon receiving the RRC message from the base station 50, the mobile station 100 detects the SAR signaling from the received RRC message and determines based on the detected SAR signaling that the SAR backoff is available in the radio communication system 10. Then, the mobile station 100 calculates $P_{cmax,\ c\_}L$ for each CC in accordance with the above-stated P-MPR introduced formula to satisfy the SAR provision and determines the maximum transmit power $P_{cmax,\ c}$.

The above embodiment has been described in terms of whether the P-MPR used as a factor to implement the SAR backoff is applicable in calculation of the lower bound $P_{cmax,\ c}\_L$ of the maximum transmit power $P_{cmax,\ c}$. However, the present invention is not limited to this, and any other factor selectively applied in accordance with information provided from a base station may be used in the maximum transmit power determination operation in a mobile station.

Also, the power reduction factor P-MPR to implement the SAR backoff is not limited to a predefined value but may be a variable value. For example, different SAR provisions may be applied in different countries or regions, which may lead to a possibility that different P-MPRs may be set for different radio communication systems. In this case, the SAR signaling transmitted from the base station 50 may not only indicate availability of the SAR backoff but also indicate a value of the P-MPR that should be applied in that radio communication system.

Next, a mobile station according to the second embodiment of the present invention is described with reference to FIGS. 5-6. In this embodiment, a mobile station uses a country code included in broadcast information from a base station to determine whether the SAR backoff can be applied in the radio communication system and derives the maximum transmit power $P_{cmax,\ c}$ for each CC depending on the determination result.

Figure 5:
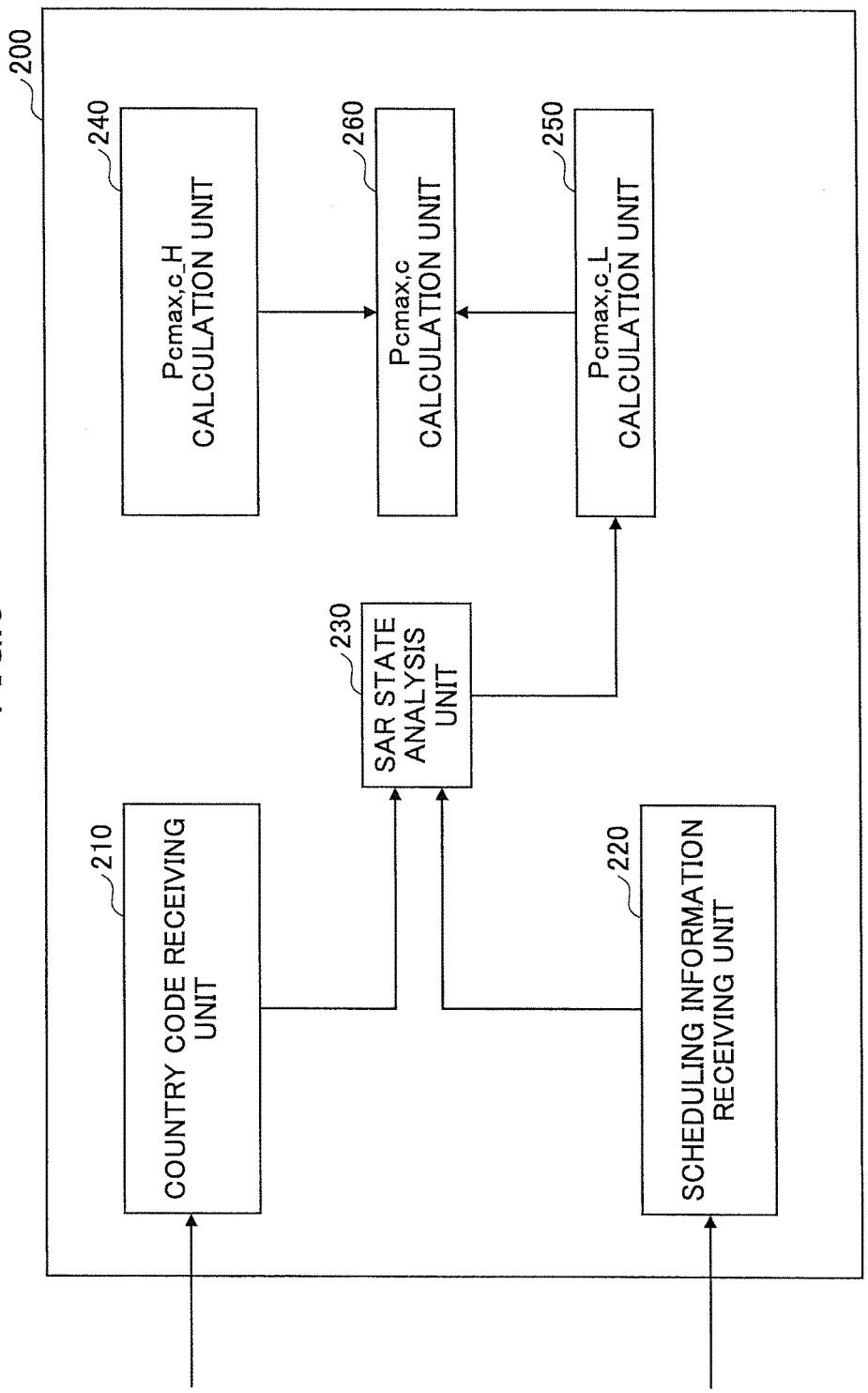
FIG. 5 is a block diagram for illustrating a mobile station according to a second embodiment of the present invention.

FIG. 5 is a block diagram for illustrating a mobile station according to the second embodiment of the present invention. As illustrated in FIG. 5, a mobile station 200 includes a country code receiving unit 210, a scheduling information receiving unit 220, a SAR state analysis unit 230, a $P_{cmax,\ c}\_H$ calculation unit 240, a $P_{cmax,\ c}\_L$ calculation unit 250 and a $P_{cmax,\ c}$ calculation unit 260. Here, the $P_{cmax,\ c}\_H$ calculation unit 240, the $P_{cmax,\ c}\_L$ calculation unit 250 and the $P_{cmax,\ c}$ calculation unit 260 perform the same operations as the $P_{cmax,\ c}\_H$ calculation unit 140, the $P_{cmax,\ c}\_L$ calculation unit 150 and the $P_{cmax,\ c}$ calculation unit 160, respectively, and duplicated descriptions are omitted.

The country code receiving unit 210 receives broadcast information from the base station 50, extracts a country code from the received broadcast information and provides the extracted country code to the SAR state analysis unit 230.

The scheduling information receiving unit 220 receives a control signal from the base station 50. This control signal typically consists of various control information pieces for uplink communication and includes scheduling information such as resource blocks assigned by the base station 50 to CCs. The scheduling information receiving unit 220 extracts the scheduling information from the received control signal and provides the extracted scheduling information to the SAR state analysis unit 230.

The SAR state analysis unit 230 has SAR backoff availability information indicating whether the SAR backoff is available in countries or regions associated with country codes. Preferably, the SAR backoff availability information can be updated as needed. Upon receiving a country code from the country code receiving unit 210, the SAR state analysis unit 230 determines whether the SAR backoff is available in a country or region corresponding to the received country code with reference to the SAR backoff availability information. If the SAR backoff is available in the country or region, the SAR state analysis unit 230 informs the $P_{cmax,\ c}\_L$ calculation unit 250 that the SAR backoff can be applied. Also, the SAR state analysis unit 230 provides the scheduling information supplied from the scheduling information receiving unit 220 to the $P_{cmax,\ c}\_L$ calculation unit 250 to indicate which CC is assigned a resource block.

Figure 6:
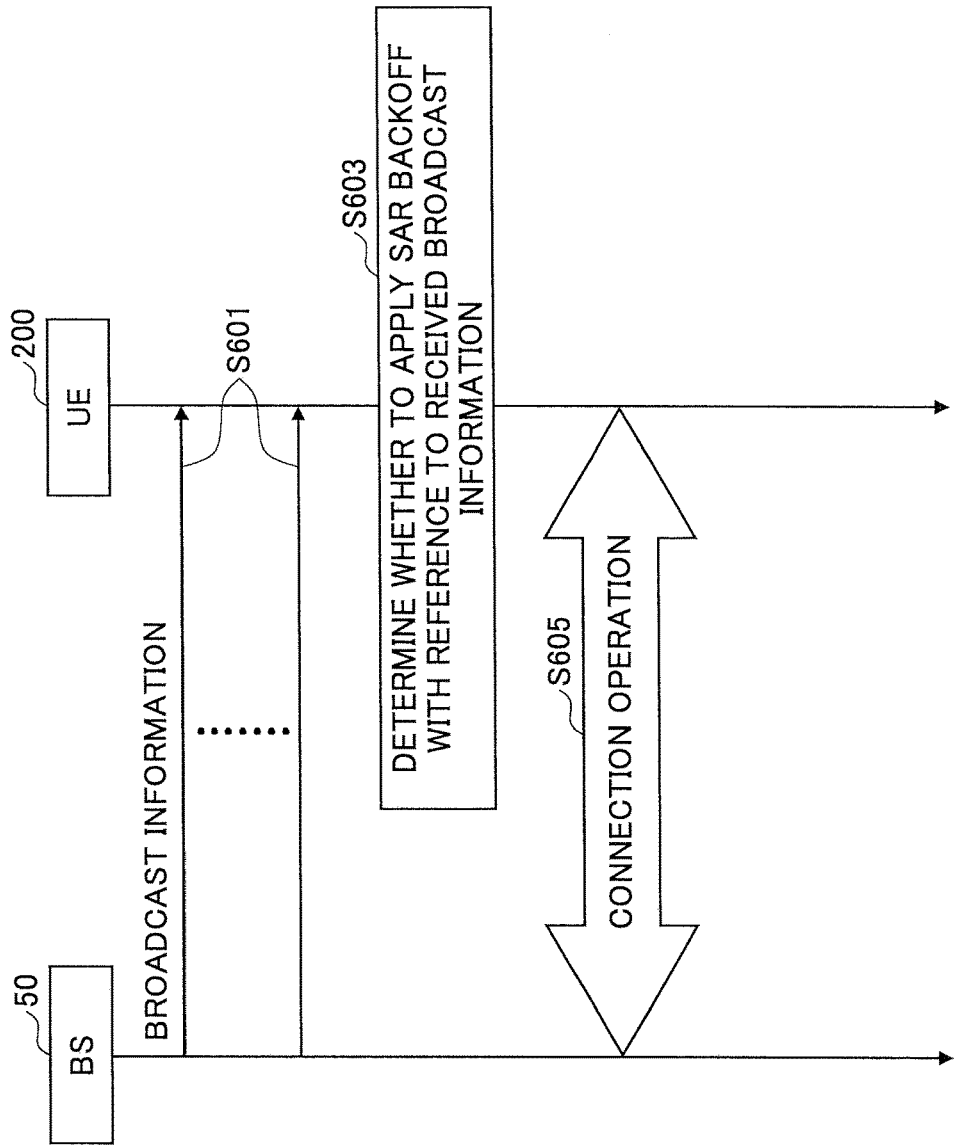
FIG. 6 is a sequence diagram for illustrating one exemplary operation in the radio communication system according to the second embodiment of the present invention.

FIG. 6 is a sequence diagram for illustrating one exemplary operation in a radio communication system according to the second embodiment of the present invention. In this embodiment, an operation where a mobile station detects a country code from broadcast information from a base station and determines whether the SAR backoff is available is described.

At step S601, the base station (BS) 50 periodically broadcasts information including a country code indicative of an installation country of the radio communication system 10 to which the base station 50 belongs.

At step S603, upon receiving the broadcast information from the base station 50, the mobile station (UE) 200 extracts the country code from the received broadcast information and determines whether the SAR backoff is available in the country or region corresponding to the extracted country code with reference to the SAR backoff availability information stored in the mobile station 200.

At step S605, the mobile station 200 performs a connection operation in accordance with the received broadcast information to establish a radio connection with the base station 50. After establishing the radio connection, if the SAR backoff is available, the mobile station 200 calculates $P_{cmax,\ c}\_L$ for each CC to satisfy the SAR provision in accordance with the above-stated P-MPR introduced formula and determines the maximum transmit power $P_{cmax,\ c}$. On the other hand, if the SAR backoff is not available, the mobile station 200 calculates $P_{cmax,\ c}\_L$ for each CC in accordance with the formula without the P-MPR and determines the maximum transmit power $P_{cmax,\ c}$.

The above embodiment has been described in terms of whether the P-MPR, which is a factor to implement the SAR backoff, can be applied in calculation of the lower bound $P_{cmax,\ c}\_L$ of the maximum transmit power $P_{cmax,\ c}$. However, the present invention is not limited to this, and any other factor selectively applied in accordance with information provided from the base station may be used in the maximum transmit power determination operation in the mobile station.

Also, the power reduction factor P-MPR to implement the SAR backoff is not necessarily limited to a predefined value but may be a variable value. For example, different SAR provisions may be provided in different countries or regions, which may lead to a probability that different P-MPRs may be set for different radio communication systems. In this case, the SAR backoff availability information stored in the mobile station 200 may not only indicate availability of the SAR backoff in the country or region associated with the received country code but also store a value of the P-MPR that should be applied.

Although the embodiments of the present invention have been described in detail, the present invention is not limited to the above-stated specific embodiments and can be changed and modified within the scope of the present invention defined in claims.

This international patent application is based on and claims the benefit of priority of Japanese Priority Application No. 2011-080202 filed on Mar. 31, 2011, the entire contents of which are hereby incorporated by reference.

LIST OF REFERENCE SYMBOLS

10: radio communication system
50: base station
100, 200: mobile station

The invention claimed is:

1. A mobile station having a Specific Absorption Rate (SAR) backoff function, comprising:
    a receiver that receives broadcast information from a base station; and
    a processor that:
        determines whether a SAR backoff is available based on the broadcast information received from the base station, and
        determines, after the mobile station performs a connection operation with the base station based on the broadcast information and after the processor determines whether the SAR backoff is available, a maximum transmit power of the mobile station,
    wherein:
        the processor determines whether the SAR backoff is available before the connection operation with the base station is performed,
        the processor applies a power reduction factor P-MPR associated with the SAR backoff for each component carrier for carrier aggregation configured after the connection operation to determine a lower bound $P_{cmax,c\_L}$ of the maximum transmit power in accordance with $P_{cmax, c\_L}=\text{Min}\{P_{EMAX}-\Delta T_c, P_{PowerClass}-\text{MAX}(\text{MPR}+\text{A-MPR}, \text{P-MPR})-\Delta T_c\}$, and
        $P_{cmax, c\_L}$ is the lower bound of the maximum transmit power for the component carrier, $P_{EMAX}$ is the maximum transmit power for the component carrier, $\Delta T_c$ is an allowable reduction amount in use of a resource block in a band edge of the component carrier, $P_{PowerClass}$ is a maximum transmit power that should be provided to the mobile station, MPR (Maximum Power Reduction) is a first allowable power reduction amount determined based on the modulation scheme and a number of resource blocks, and A-MPR (Additional Maximum Power Reduction) is a second allowable power reduction amount to avoid interfering with an adjacent wireless communication system.

2. The mobile station as claimed in claim 1, wherein the broadcast information further includes a specified value of the power reduction factor associated with the SAR backoff, and the maximum transmit power determination unit applies the specified value of the power reduction factor to determine the maximum transmit power.

3. A method for use in a radio communication system including a mobile station having a Specific Absorption Rate (SAR) backoff function and a base station wirelessly communicating to the mobile station, the method comprising:
    the base station transmitting broadcast information to the mobile station;
    the mobile station receiving the broadcast information from the base station;
    the mobile station determining, after the mobile station performs a data connection operation with the base station based on the broadcast information, whether a SAR backoff is available based on the broadcast information received from the base station; and
    the mobile station applying a power reduction factor P-MPR associated with the SAR backoff for each component carrier for carrier aggregation configured after the connection operation to determine a lower bound $P_{cmax,c\_L}$ of the maximum transmit power of the mobile station in accordance with $P_{cmax, c\_L}=\text{Min}\{P_{EMAX}-\Delta T_c, P_{PowerClass}-\text{MAX}(\text{MPR}+\text{A-MPR}, \text{P-MPR})-\Delta T_c\}$,
    wherein:
        the processor determines whether the SAR backoff is available before the connection operation with the base station is performed, and $P_{cmax, c\_L}$ is the lower bound of the maximum transmit power for the component carrier, $P_{EMAX}$ is the maximum transmit power for the component carrier, $\Delta T_c$ is an allowable reduction amount in use of a resource block in a band edge of the component carrier, $P_{PowerClass}$ is a maximum transmit power that should be provided to the mobile station, MPR (Maximum Power Reduction) is a first allowable power reduction amount determined based on the modulation scheme and a number of resource blocks, and A-MPR (Additional Maximum Power Reduction) is a second allowable power reduction amount to avoid interfering with an adjacent wireless communication system.

4. A mobile station having a Specific Absorption Rate (SAR) backoff function, comprising:
    a receiver that receives broadcast information from a base station; and
    a processor that:
        determines whether a SAR backoff is available based on a country code in the broadcast information from the base station, and
        determines, after the mobile station performs a connection operation with the base station based on the broadcast information, a maximum transmit power of the mobile station,
    wherein:
        the processor determines whether the SAR backoff is available before the connection operation with the base station is performed,
        the processor applies a power reduction factor P-MPR associated with the SAR backoff for each component carrier for carrier aggregation configured after the connection operation to determine a lower bound $P_{cmax,c\_L}$ of the maximum transmit power in accordance with $P_{cmax, c\_L}=\text{Min}\{P_{EMAX}-\Delta T_c, P_{PowerClass}-\text{MAX}(\text{MPR}+\text{A-MPR}, \text{P-MPR})-\Delta T_c\}$, and
        $P_{cmax, c\_L}$ is the lower bound of the maximum transmit power for the component carrier, $P_{EMAX}$ is the maximum transmit power for the component carrier, $\Delta T_c$ is an allowable reduction amount in use of a resource block in a band edge of the component carrier, $P_{PowerClass}$ is a maximum transmit power that should be provided to the mobile station, MPR (Maximum Power Reduction) is a first allowable power reduction amount determined based on the modulation scheme and a number of resource blocks, and A-MPR (Additional Maximum Power Reduction) is a second allowable power reduction amount to avoid interfering with an adjacent wireless communication system.

5. The mobile station as claimed in claim 4, wherein the broadcast information further includes a specified value of the power reduction factor applied in countries or regions associated with country codes, and the maximum transmit power determination unit applies the specified value of the power reduction factor to determine the maximum transmit power.

6. A method for use in a radio communication system including a mobile station having a Specific Absorption Rate (SAR) backoff function and a base station wirelessly communicating to the mobile station, the method comprising:
    the base station transmitting broadcast information to the mobile station;
    the mobile station receiving the broadcast information from the base station;

the mobile station determining, after the mobile station performs a connection operation with the base station based on the broadcast information, whether a SAR backoff is available based on a country code in the broadcast information; and the mobile station applying a power reduction factor P-MPR associated with the SAR backoff for each component carrier for carrier aggregation configured after the connection operation to determine a lower bound $P_{cmax, c\_L}$ of the maximum transmit power of the mobile station in accordance with $P_{cmax, c\_L} = \mathrm{Min}\{P_{EMAX}-\Delta T_c, P_{PowerClass}-\mathrm{MAX}(\mathrm{MPR}+\mathrm{A}\text{-}\mathrm{MPR}, \mathrm{P}\text{-}\mathrm{MPR})-\Delta T_c\}$, wherein:

the processor determines whether the SAR backoff is available before the connection operation with the base station is performed, and $P_{cmax, c\_L}$ is the lower bound of the maximum transmit power for the component carrier, $P_{EMAX}$ is the maximum transmit power for the component carrier, $\Delta T_c$ is an allowable reduction amount in use of a resource block in a band edge of the component carrier, $P_{PowerClass}$ is a maximum transmit power that should be provided to the mobile station, MPR (Maximum Power Reduction) is a first allowable power reduction amount determined based on the modulation scheme and a number of resource blocks, and A-MPR (Additional Maximum Power Reduction) is a second allowable power reduction amount to avoid interfering with an adjacent wireless communication system.

* * * * *